July 3, 1956
V. G. JENNER ET AL
2,753,099
FILLING MACHINES
Filed Nov. 23, 1953
3 Sheets-Sheet 1
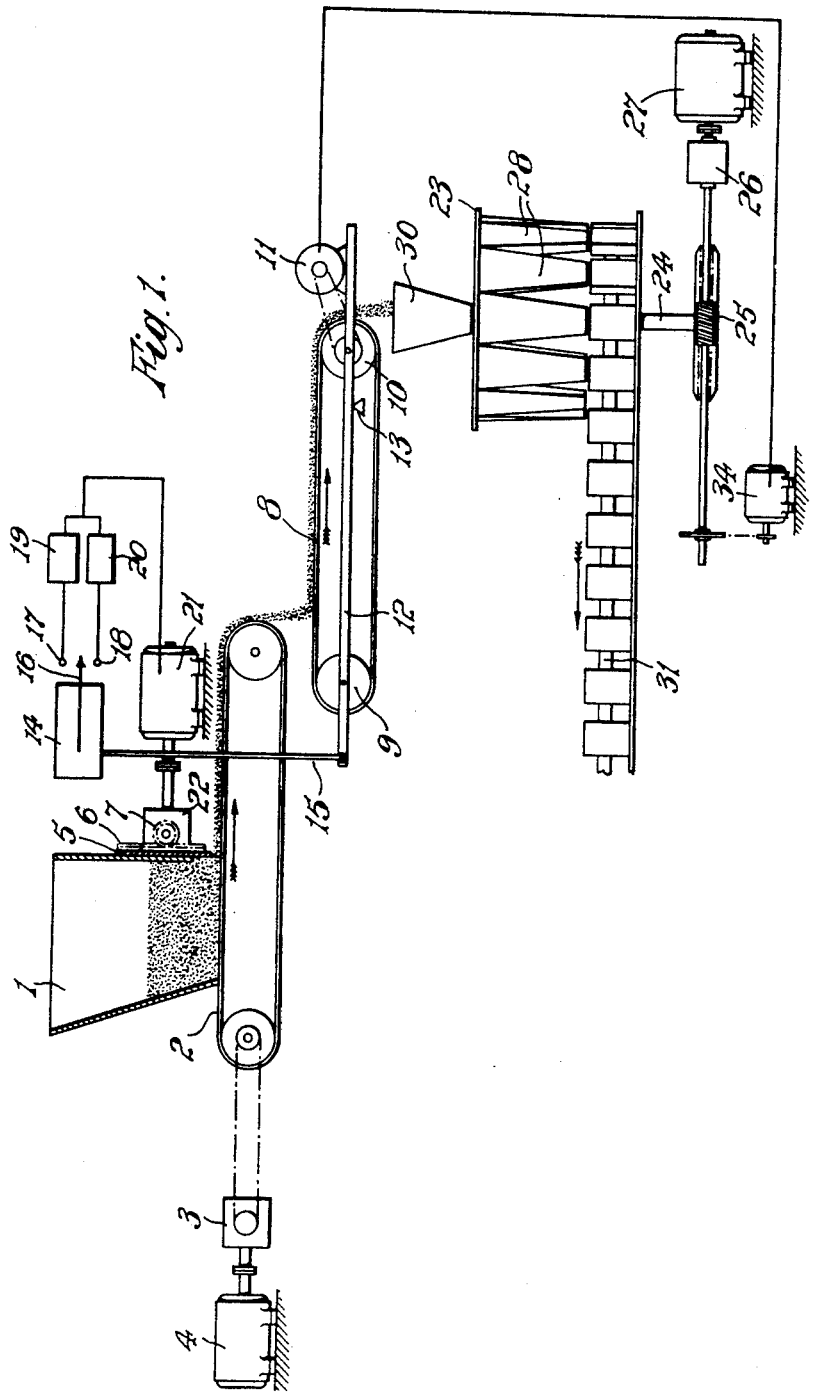
INVENTORS
VIVIAN DESMOND WORSTALL
& VICTOR GEORGE JENNER
ATTORNEYS

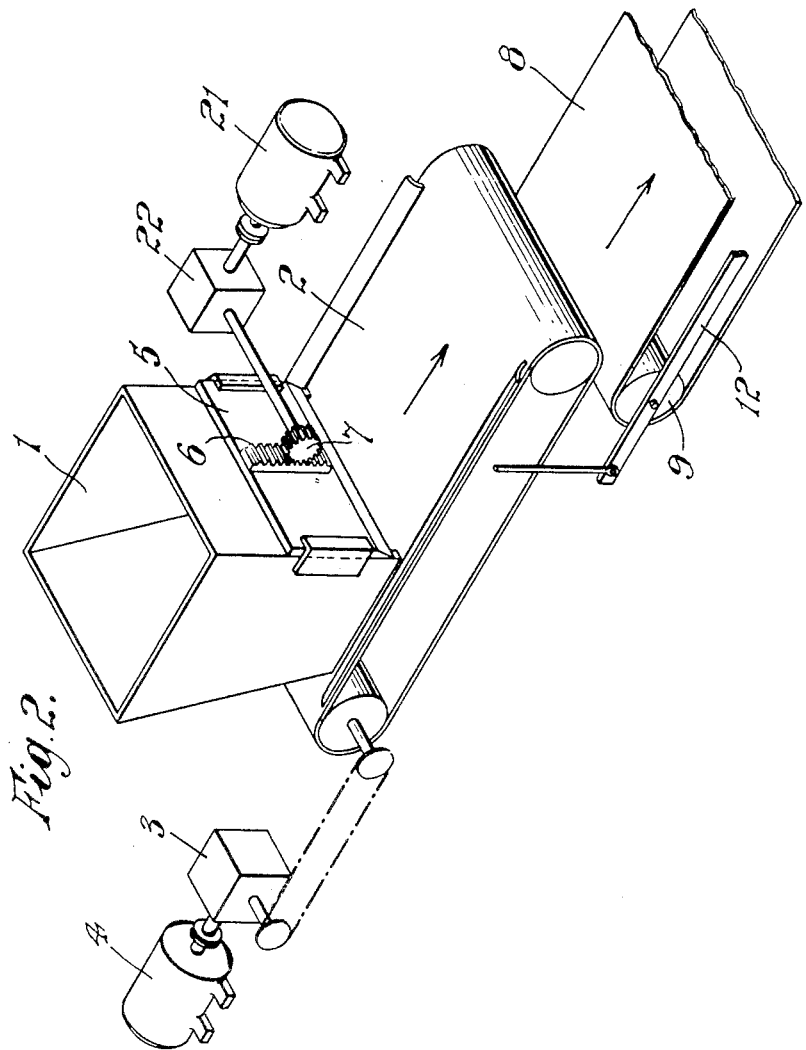

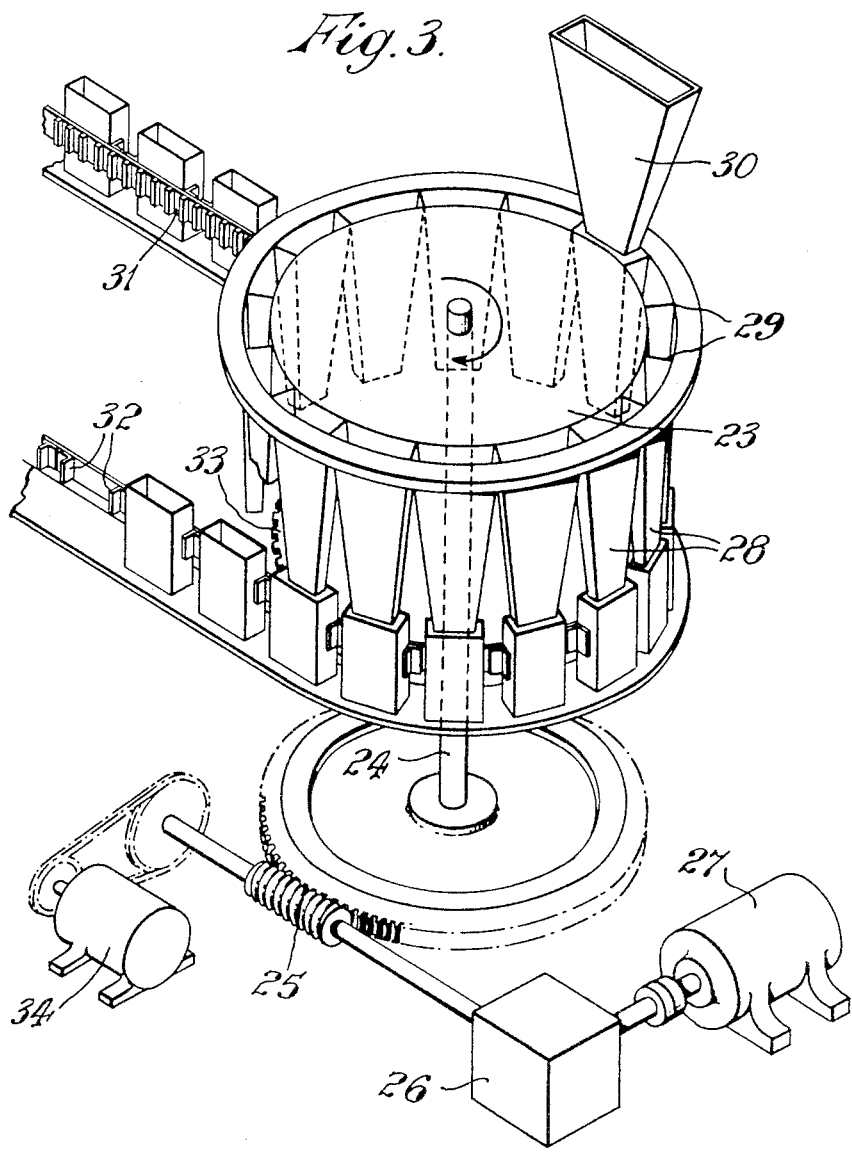

United States Patent Office 2,753,099
Patented July 3, 1956

2,753,099
FILLING MACHINES

Victor George Jenner, New Ferry, and Vivian Desmond Worstall, Bebington, Wirral, England, assignors to Lever Brothers Company, New York, N. Y., a corporation of Maine Application November 23, 1953, Serial No. 393,908

Claims priority, application Great Britain December 1, 1952

7 Claims. (Cl. 226—95)

This invention relates to machines for filling containers with a predetermined weight of comminuted material.

Many consumer goods such as detergent powders are sold by weight, and the speed and accuracy of filling are factors which affect the manufacturing cost of the product.

Weighing fillers are known which utilise a battery consisting of a plurality of individual automatic weighers. Each automatic weigher weighs the required quantity of comminuted material and ejects it into a container. A high accuracy of filling can be achieved provided sufficient time is allowed for the completion of the weighing cycle.

It is an object of the present invention to provide a machine for the accurate and speedy filling of containers with a predetermined weight of comminuted material.

According to the present invention there is provided a machine for filling containers with a predetermined weight of comminuted material, which machine comprises a feeder arranged to deliver a stream of comminuted material, an adjustable quantity supplier arranged to supply the feeder with the material, weighing means responsive to the weight of the material on the feeder, control means responsive to the weighing means for controlling the adjustable quantity supplier to keep the said weight constant, a rotatable filling head having a plurality of equi-spaced delivery funnels, filling head rotating means for moving the funnels through said stream of material, container moving means arranged to move each container in register with the lower end of a funnel while the funnel moves through the said stream of material, and synchronising means for synchronising the speed of the feeder with the speed of rotation of the filling head.

The adjustable quantity supplier may comprise a hopper or chute for the material, a belt type conveyor with its upper surface directly below an opening in the bottom of the hopper, means for driving the belt, and a gate attached to the front side of the hopper for controlling the depth of the layer of material leaving the hopper on the belt. The last alternative is preferred. In the last two alternatives, the quantity of material may be adjusted by adjusting the gap between the gate and the drum or conveyor, respectively, or by changing the speed of rotation of the drum or the speed of movement of the belt, respectively.

The weighing means are preferably provided with a pointer the displacement of which is a function of the weight of the material on the feeder. The control means may be in the form of relays actuated by detecting elements. The detecting elements may operate on a change of reactance, or may have electrical contacts, for detecting a displacement of the pointer from a predetermined position and, hence, a deviation of the weight of material on the feeder from a predetermined value. Control means in the form of relays actuated by elements responsive to reactance changes are generally referred to as proximity switches.

The synchronising means comprise preferably a remote position transmitter motor coupled to the rotatable filling head and a remote position repeater motor arranged to control the feeder. The motors are preferably three-phase power selsyn motors.

A preferred embodiment of a machine according to the present invention will now be described with reference to the accompanying drawings in which:

Fig. 1 shows diagrammatically an elevation of the machine,

Fig. 2 shows diagrammatically a perspective view of the adjustable quantity supplier and associated equipment, and Fig. 3 shows diagrammatically a perspective view of the filling head and associated equipment.

The comminuted material is fed from a suitable source, not shown, into a hopper 1, three sides of which rest on a belt conveyor 2 which is driven through a gear box 3 by means of an electric motor 4. The direction of movement of the conveyor belt is shown by means of an arrow. These three sides of the hopper together with the front side, form the periphery of the above mentioned opening in the bottom of the hopper.

The front side of the hopper is provided with a movable gate 5 which can be moved up and down by means of a rack 6 and pinion 7 to adjust the gap between the lower edge of the gate and the belt 2 and, hence, the depth of the layer of material leaving the hopper on the belt.

The comminuted material from the belt conveyor 2 falls on to the belt 8 of the feeder. The belt 8 passes over a loose pulley 9 and over a driving pulley 10 which is coupled by means of a driving belt to a three-phase power selsyn repeater motor 11.

The pulleys 9, 10 and the repeater selsyn motor 11 are mounted on a framework 12 which is supported on a set of knife edge bearings 13. The set consists of two bearings, one being placed on each side of the framework 12 on an axis at right angles to the direction of movement of the belt 8.

The repeater selsyn motor 11 is secured to the framework 12 at such a distance from the axis of the knife edge bearing that the framework is balanced when the correct weight of material is on the belt 8.

The framework is mechanically linked with the weighing means 14 by means of a link mechanism 15 attached to the end of the framework 12 near the pulley 9. The weighing means has a pointer 16 the displacement of which is a function of the pull on the link mechanism and, hence, of the weight of material on the belt 8. The free end of the pointer 16 is situated between the electrodes 17, 18 of two proximity switches 19, 20 respectively. These two proximity switches constitute the control means. The arrangement is such that when the correct weight of material is situated on the belt 8, the end of the pointer is situated midway between the two electrodes. The control means control the reversible electric motor 21 which is mechanically coupled to the pinion 7 by means of a gear box 22. Thus any deviation of the weight of material on the belt 8 actuates one of the proximity switches which energises the motor 21 which, in turn, adjusts the gate until the weight again reaches the predetermined value. If desired, feed back or a delay mechanism may be incorporated to reduce "hunting."

The filling head has a circular table 23 secured to a spindle 24. The spindle 24 is rotated through a worm gear 25 and a gear box 26 by means of an electric variable speed motor 27. The circular table carries twelve identically constructed equi-spaced funnels 28, each funnel being separated from its neighbour by a knife edge 29 to give a sharp cut off from the material issuing from the chute 30 which acts as a guide for the stream of material falling off the belt 8.

The container moving means are in the form of a chain container conveyor 31 which has a plurality of container locators 32. The conveyor 31 is driven by means of a sprocket wheel 33 keyed to the spindle 24. The container locators are so arranged relative to the funnels that as a carton enters the filling head it comes into register with the lower end of a funnel not later than when said funnel passes below the chute 30, rotates with that funnel round the spindle through approximately 180°, and then leaves the filling head.

Also coupled to the spindle 24 is a transmitter selsyn motor 34 which is electrically connected to the repeater selsyn motor 11. The arrangement is such that the rotors of the selsyn motors rotate in synchronism and, hence, that the ratio of the speed of movement of the funnels past the chute 30 to the speed of movement of the conveyor 8 is constant. Moreover, as the actual displacement of the funnels and of the bolt 8 is synchronised, the motor 27 can be started and stopped and its speed changed without introducing any long term error in the weight of material filled into the containers.

The mode of operation of the machine is as follows. The machine is assumed to be filling containers with the correct weight of material. If now, for example, a decrease of density of the material occurs, the adjustable volume supplier will continue to supply the same volume of material but the weight of material on the belt 8 of the feeder will decrease. This will cause a movement of the framework 12 about the knife edge bearings 13. This movement is transmitted to the weighing means 14. The decrease in weight causes the scale pointer 16 to approach the lower electrode 18 thereby energising the lower proximity switch 20 which closes a relay in the supply circuit of the motor 21 which thereupon drives the pinion 7 to raise the gate 5. When the weight of material on the belt 8 has again reached the predetermined value, the pointer 16 will return to its previous position midway between the two electrodes and the system will again be in balance. In order to prevent "hunting," there is a small neutral zone in which the pointer 16 can move without energising either of the two proximity switches.

This decrease of the weight of material on the belt 8 of the feeder may also, for example, have been caused by a reduction in the speed of the motor 4 which drives the belt 2.

To illustrate another possibility, assume that the departure from equilibrium is caused by a decrease in speed of the motor 27. The funnels will now be below the stream for a longer period and, consequently, receive too great a weight of material. This decrease in speed is passed by the transmitter selsyn motor 34 to the repeater selsyn motor 11 which thereupon drives the belt 8 at a correspondingly lower speed. As the speed of belt 8 decreases, the weight of material on it will increase. This increase of weight of material is transmitted, as has been described above, to the control means which, in turn, energise the motor 21 which lowers the gate 5 until the weight of material on the belt 8 again reaches the predetermined value.

It will be evident that the weighing means does not weigh the true weight of the material on the belt; the material near the pulley 9 will have a greater effect than the material near pulley 10. The errors introduced by this are, however, negligible. If desired, the true weight of the material on the feeder may be measured.

We claim:

1. A machine for filling containers with a predetermined weight of comminuted material, which machine comprises in combination a feeder arranged to deliver a stream of comminuted material, an adjustable quantity supplier arranged to supply the feeder with the material, weighing means responsive to the weight of the material on the feeder, control means responsive to the weighing means for controlling the adjustable quantity supplier to keep the said weight constant, a rotatable filling head having a plurality of equi-spaced delivery funnels, filling head rotating means for moving the funnels through said stream of material, container moving means arranged to move each container in register with the lower end of a funnel while the funnel moves through the said stream of material, and synchronising means for synchronising the speed of the feeder with the speed of rotation of the filling head.

2. A machine for filling containers with a predetermined weight of comminuted material, which machine comprises in combination a conveyor of the endless belt type arranged to deliver a stream of comminuted material, an adjustable quantity supplier arranged to supply the conveyor with the material, weighing means responsive to the weight of the material on the conveyor, control means responsive to the weighing means for controlling the adjustable quantity supplier to keep the said weight constant, a rotatable filling head having a plurality of equi-spaced delivery funnels, filling head rotating means for moving the funnels through said stream of material, container moving means arranged to move each container in register with the lower end of a funnel while the funnel moves through the said stream of material, and synchronising means for synchronising the speed of the conveyor with the speed of rotation of the filling head.

3. A machine for filling containers with a predetermined weight of comminuted material, which machine comprises in combination a conveyor of the endless belt type arranged to deliver a stream of comminuted material, an adjustable quantity supplier arranged to supply the conveyor with the material, weighing means responsive to the weight of the material on the conveyor, control means responsive to the weighing means for controlling the adjustable quantity supplier to keep the said weight constant, a rotatable filling head having a plurality of equi-spaced delivery funnels, filling head rotating means for moving the funnels through said stream of material, a remote position transmitter motor coupled to the rotatable filling head, a remote position repeater motor arranged to drive the belt of the conveyor, said two motors being electrically connected to one another, and container moving means arranged to move each container in register with the lower end of a funnel while the funnel moves through the said stream of material.

4. A machine for filling containers with a predetermined weight of comminuted material as claimed in claim 3 in which the remote position transmitter and repeater motors are three-phase power selsyn transmitter and repeater motors.

5. A machine for filling containers with a predetermined weight of comminuted material, which machine comprises in combination a feeder arranged to deliver a stream of comminuted material, an adjustable quantity supplier arranged to supply the feeder with the material, said adjustable quantity supplier comprising a hopper for the material, a conveyor of the endless belt type with its upper surface directly below an opening in the bottom of the hopper, means for driving the belt of the conveyor, and an adjustable gate attached to the front side of the hopper for controlling the depth of the layer of material leaving the hopper on the belt, weighing means responsive to the weight of the material on the feeder, control means responsive to the weighing means for controlling the adjustable gate to keep the said weight constant, a rotatable filling head having a plurality of equi-spaced delivery funnels, filling head rotating means for moving the funnels through said stream of material, container moving means arranged to move each container in register with the lower end of a funnel while the funnel moves through the said stream of material, and synchronising means for synchronising the speed of the feeder with the speed of rotation of the filling head.

6. A machine for filling containers with a predetermined weight of comminuted material as claimed in claim 5 in which the synchronising means comprise a remote position transmitter motor coupled to the rotatable filling head and a remote position repeater motor which constitutes the means for driving the feeder, said two motors being electrically connected to one another.

7. A machine for filling containers with a predetermined weight of comminuted material, which machine comprises in combination a feeder arranged to deliver a stream of comminuted material, an adjustable quantity supplier arranged to supply the feeder with the material, weighing means responsive to the weight of the material on the feeder, said weighing means being provided with a pointer the displacement of which is a function of the weight of material on the feeder, control means for controlling the adjustable quantity supplier to keep the said weight constant, said control means being provided with detecting elements for detecting displacements of the pointer from a predetermined position, a rotatable filling head having a plurality of equi-spaced delivery funnels, filling head rotating means for moving the funnels through said stream of material, container moving means arranged to move each container in register with the lower end of a funnel while the funnel moves through said stream of material, and synchronising means for synchronising the speed of the feeder with the speed of rotation of the filling head.

References Cited in the file of this patent

UNITED STATES PATENTS

| | | |
|---|---|---|
| 2,273,330 | Robinson | Feb. 17, 1942 |
| 2,447,594 | Petersen | Aug. 24, 1948 |
| 2,637,434 | Harper | May 5, 1953 |